United States Patent [19]

Aymen

[11] Patent Number: 4,475,291
[45] Date of Patent: Oct. 9, 1984

[54] BLADE ORIENTATION GAUGE

[75] Inventor: William J. Aymen, Upper Chichester Township, Delware County, Pa.

[73] Assignee: Westinghouse Electric Corp., Pittsburgh, Pa.

[21] Appl. No.: 485,088

[22] Filed: Apr. 14, 1983

[51] Int. Cl.³ .......................... G01B 5/00; G01B 5/24
[52] U.S. Cl. ............................... 33/174 R; 33/181 R
[58] Field of Search .............. 33/174 R, 174 C, 181 R

[56] References Cited

U.S. PATENT DOCUMENTS

| | | | |
|---|---|---|---|
| 2,777,208 | 1/1957 | Skraban | 33/174 R |
| 3,158,941 | 12/1964 | Komstadius | 33/174 R |
| 3,161,961 | 12/1964 | Lyna et al. | 33/174 C |
| 4,265,023 | 5/1981 | Frost et al. | 33/174 C |
| 4,333,239 | 6/1982 | Arrigoni | 33/174 C |

Primary Examiner—Richard A. Stearns
Attorney, Agent, or Firm—F. J. Baehr, Jr.

[57] ABSTRACT

Gauges for checking the radial orientation of integrally shrouded blades wherein the shrouds abut one another to form a generally continuous shroud, the gauge having a base which fits a cylindrical surface on the rotor and extends generally radially therefrom, the blade being contacted in at least two points by the gauge which has an anvil which moves as the orientation of the blade varies and a micrometer head which measures the movement of the anvil to give a digital indication of the orientation of the blade.

7 Claims, 4 Drawing Figures

1

BLADE ORIENTATION GAUGE

BACKGROUND AND SUMMARY OF THE INVENTION

This invention relates to a gauge for checking the orientation of turbine blades installed on a rotor and more particularly to a gauge for integrally shrouded blades wherein the shrouds abut to form a continuous shroud when the blades are assembled in a circular array on the turbine rotor.

A gauge for determining the orientation of a blade installed on a rotor is particularly useful for blades described in application entitled "Turbine Blades With Integral Shroud and Method of Assembling a Circular Array of Rotatable Blades" filed by the Common Assignee 12-8-82 and assigned Ser. No. 446,093 which application is hereby incorporated by reference.

In general, a gauge for determining orientation of a turbine blade having a root and a tip portion and being installed on a turbine rotor having having a cylindrical surface, when made in accordance with this invention, comprises a base portion, spherical portions disposed on the base portion for contacting the cylindrical surface at two points, a support portion extending from the base portion in a generally radially outwardly direction when the spherical surfaces engage the cylindrical surface, an anvil portion movably disposed on the support portion and disposed to engage the turbine blade, a micrometer head having indicia disposed thereon and a spindle the axial position of which is indicated by the indicia whereby the orientation of the turbine blade with respect to a radial line can be determined by reading the indicia on the micrometer head when the spindle engages the anvil.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
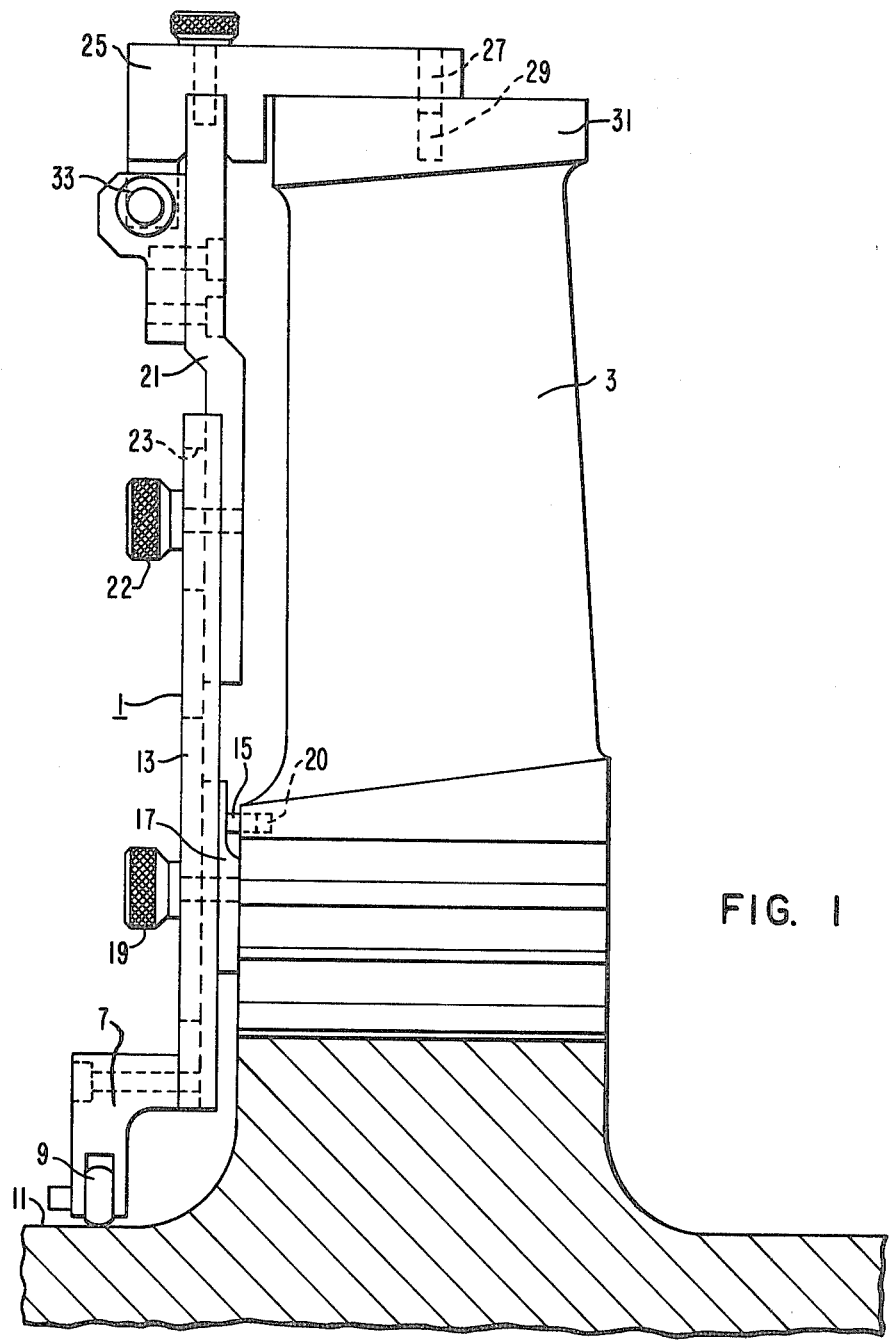
FIGS. 1 and 2 are elevational views of a gauge made in accordance with this invention disposed on a turbine blade disposed on a rotor.
Figure 2:
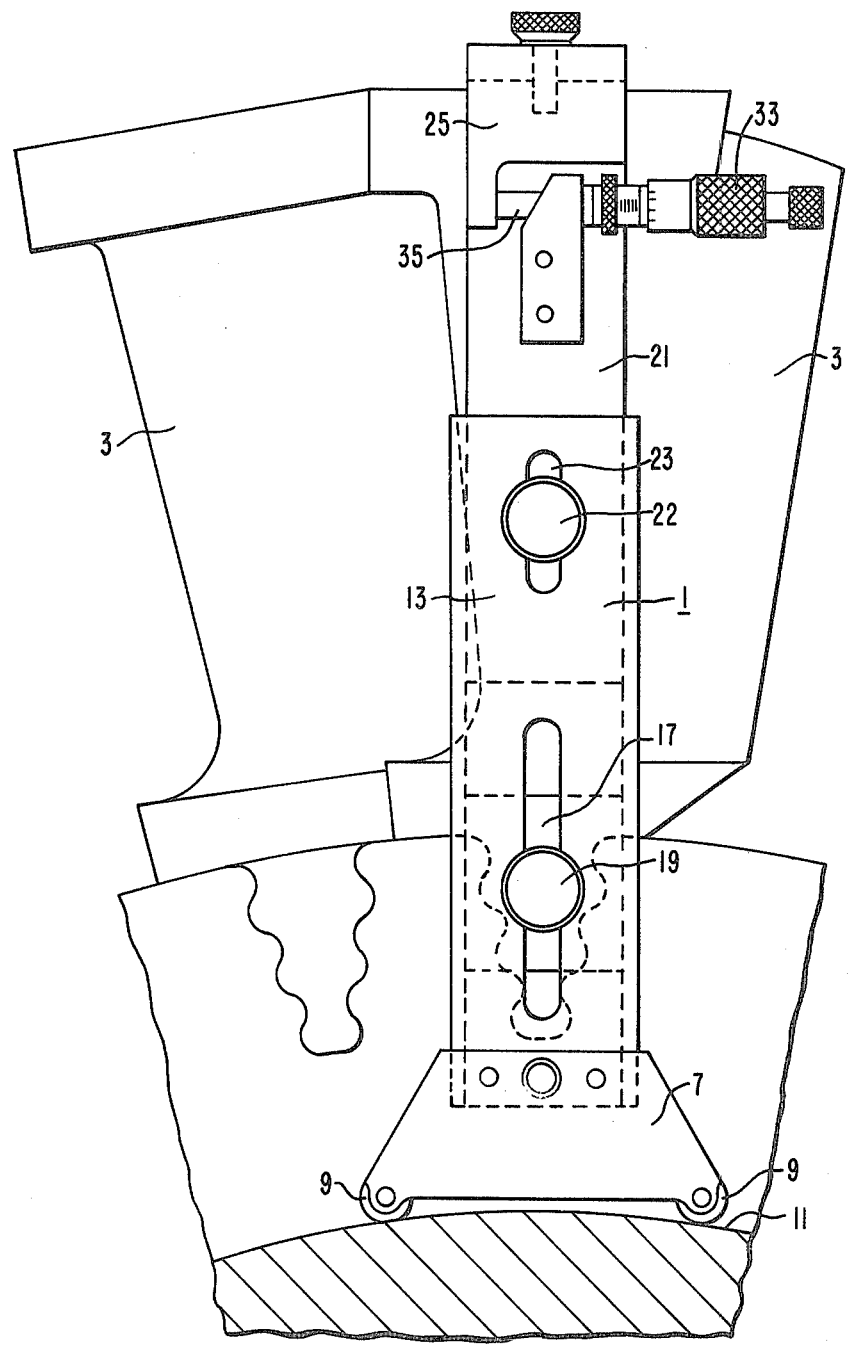

Referring now to the drawings in detail and in particular to FIGS. 1 and 2, there is shown a gauge 1 for determining the orientation of a turbine blade 3 disposed on a turbine rotor with respect to a radial line.

The gauge 1 comprises a base portion 7 having a spherical shaped roller 9 disposed on opposite sides of the base portion 7. The rollers 9 engage a cylindrical surface 11 on the turbine rotor adjacent the blades 3 to provide generally point contact therewith at two locations on the cylindrical surface 11. Extending generally radially outwardly from the base portion 7 is a support portion 13. The support portion 13 has a pin 15 and holder 17 slidably disposed in the support portion 13 adjacent the base portion 7 and a thumb screw 19 for fixing the position of the pin 15 relative to the gauge 1. A hole 20 is disposed in the blade adjacent the root portion and is generally aligned with an axial plane passing through the center line of the blade and receives the pin 15. A tip portion 21 is slidably disposed on the support portion 13 and a thumb screw 22 and slot 23 are disposed to allow the tip portion to slide longitudinally with respect to the support portion 13 to accommodate varying blade heights. An anvil 25 is slidably disposed on the tip portion 21 and has a pin 27 which registers with a hole 29 in an integral shroud 31, the hole 29 is generally coaxial with the axis of the blade 3. A micrometer head 33 is mounted on the tip portion 21 and has a spindle 35 and indicia which indicates axial displacement of the spindle 35. The micrometer head 33 is so disposed that when the spindle 35 engages the anvil 25 and the pin 27 is in the hole 29, the axial position of the spindle 35, as indicated by the indicia, is proportional to the variation in the orientation of the center line of the turbine blade 3 relative to a radially oriented line.

Figure 3:
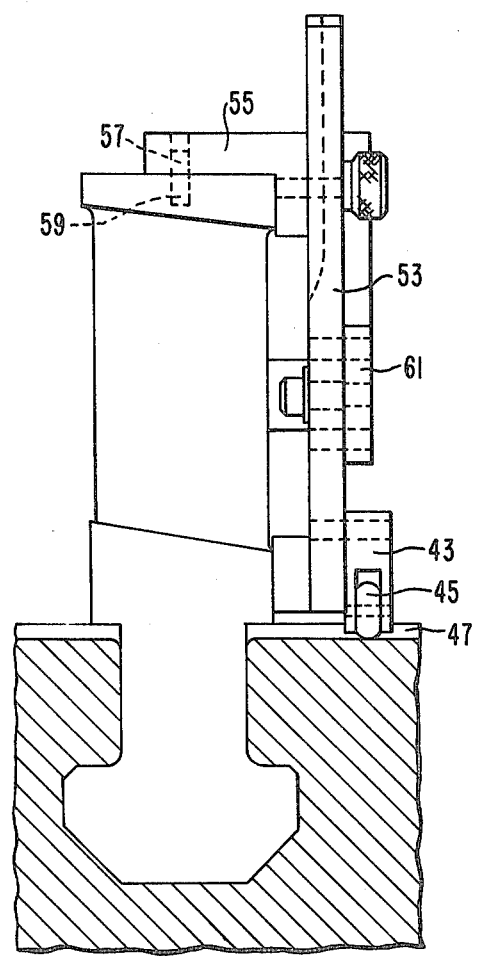
FIGS. 3 and 4 are elevational views of an alternative gauge disposed on a blade disposed on a rotor.
Figure 4:
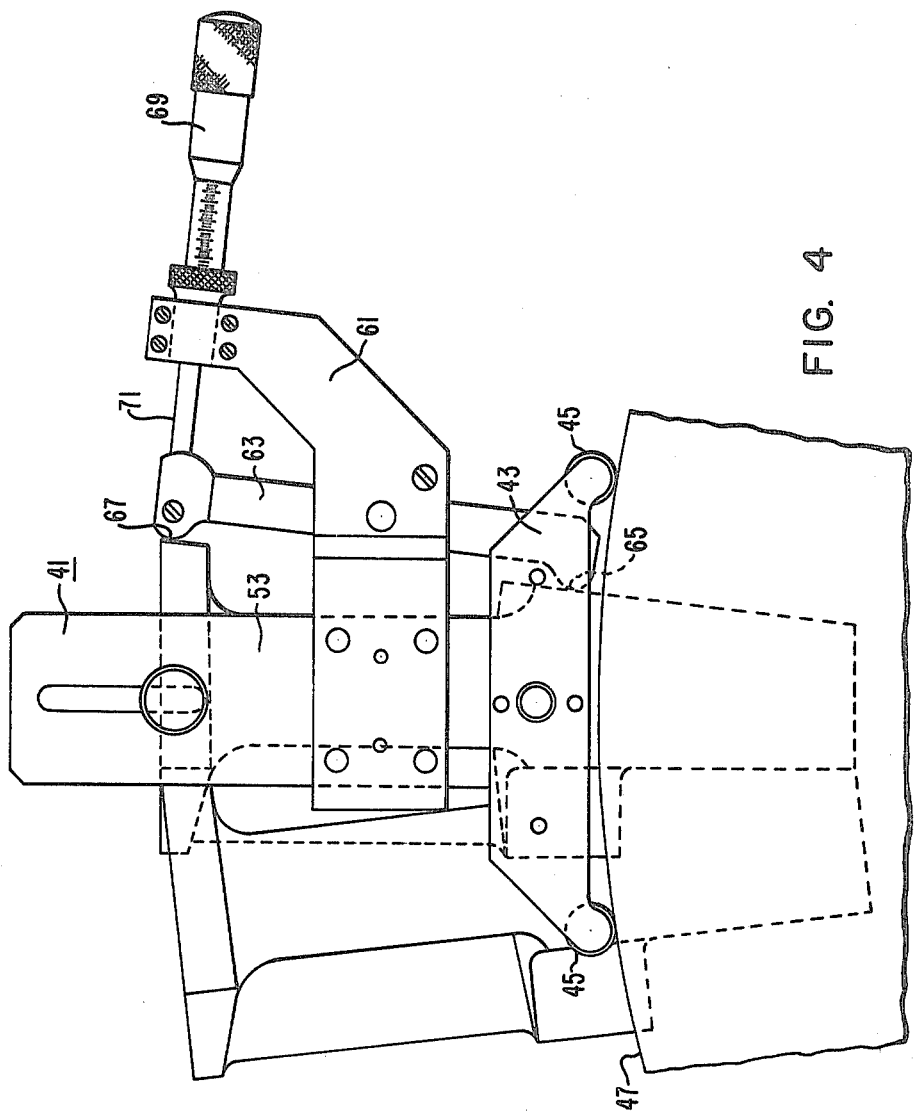

FIGS. 3 and 4 show an alternative embodiment in which a gauge 41 is shown disposed on a turbine rotor. The gauge 41 comprises a base portion 43 having spherical rollers 45 disposed on opposite sides thereof. The rollers 45 engage a cylindrical surface 47 on a turbine rotor 49 adjacent a blade 51 to provide generally point contact with two locations on the cylindrical surface 47. Extending generally radially outwardly from the base portion 43 is a support portion 53. Slidably disposed on the support portion 53 is a cap 55 which fits over the blade shroud and has a pin 57 which fits into a hole 59 disposed at the center line of the blade, however, the cap 55 need not be used to check the orientation of the blades 51. Also attached to the support portion 53 is an arm 61 extending from one side of the support portion 53. Pivotally mounted on the arm 61 is an anvil 63 which extends generally from adjacent the root portion of the blade to the shroud portion of the blade and on each end of the anvil 63 is a spherically-shaped member 65 and 67 which contact the blade to provide point contacts at locations, respectively, adjacent the root and the trailing end of the shroud. Also mounted on the arm 61 is a micrometer head 69 having a spindle 71 and indicia which indicate the axial location of the spindle 71. The spindle 71 engages the anvil 63 whereby the indicia provides a reading which is proportional to variations in the orientation of the axis of the blade relative to a radial line when the gauge is in place and engages the cylindrical surface on the rotor and the spherical surfaces on the anvil 65 and 67 engage the sides of the turbine blade when it is installed in the rotor.

The gauges hereinbefore described advantageously may be utilized to check the orientation of a turbine blade installed on a rotor with respect to a radial line.

What is claimed is:

1. A gauge for determining orientation of a turbine blade having a root and shroud portion, the turbine blade being disposed on a turbine rotor which has a cylindrical surface thereon, said gauge comprising:

a base portion;

means disposed on said base portion for contacting two points on said cylindrical surface;

a support portion extending from said base portion in a generally radially outwardly direction when said contact means engage said cylindrical surface;

an anvil portion movably disposed on said support portion and disposed to engage said turbine blade; and a micrometer head carried by said support and having indicia disposed thereon and a spindle, the axial position of which is indicated by the indicia, whereby the orientation of the turbine blade with respect to a radial line can be determined by reading the indicia on the micrometer head when the spindle engages the anvil.

2. A gauge as set forth in claim 1, wherein the anvil has a pin disposed therein.

3. A gauge as set forth in claim 2, wherein the turbine blade has a hole aligned with the center line of the blade and the pin on the anvil fits into said hole.

4. A gauge as set forth in claim 3, wherein the support portion has a pin dissposed therein and the turbine blade has a hole disposed radially outwardly from a bottom portion of the root portion of the blade and the pin in the support portion fits into the last-mentioned hole.

5. A gauge as set forth in claim 2, wherein the support portion has an arm that extends therefrom and the arm has a hole disposed therein and the pin fits into said hole and the anvil is pivotally mounted on said pin.

6. A gauge as set forth in claim 5, wherein the anvil contacts the turbine blade at two locations.

7. A gauge as set forth in claim 6, wherein one of the locations where the anvil contacts the blade is adjacent the shroud and the other location is adjacent the root.

* * * * *